Patented June 30, 1942

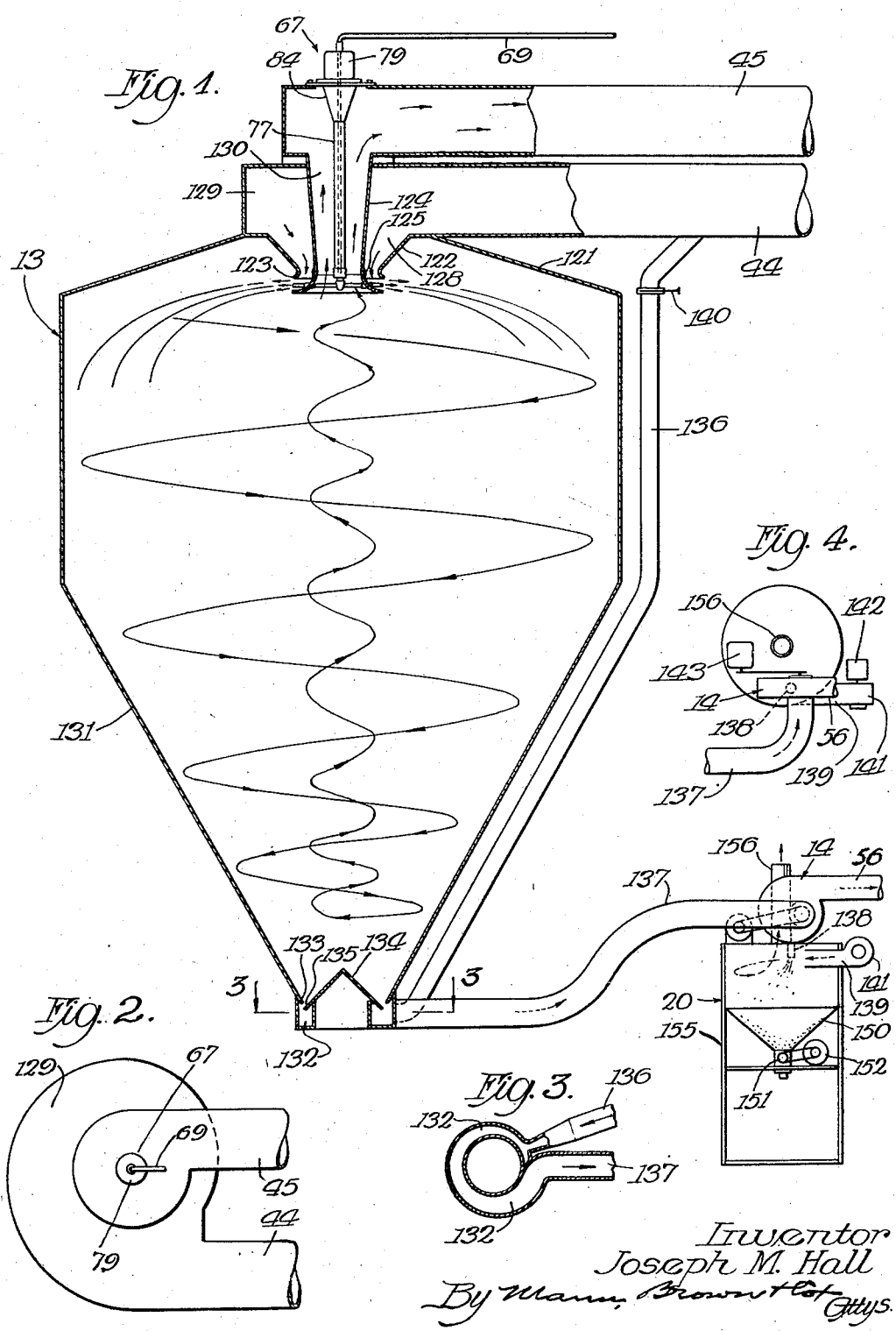

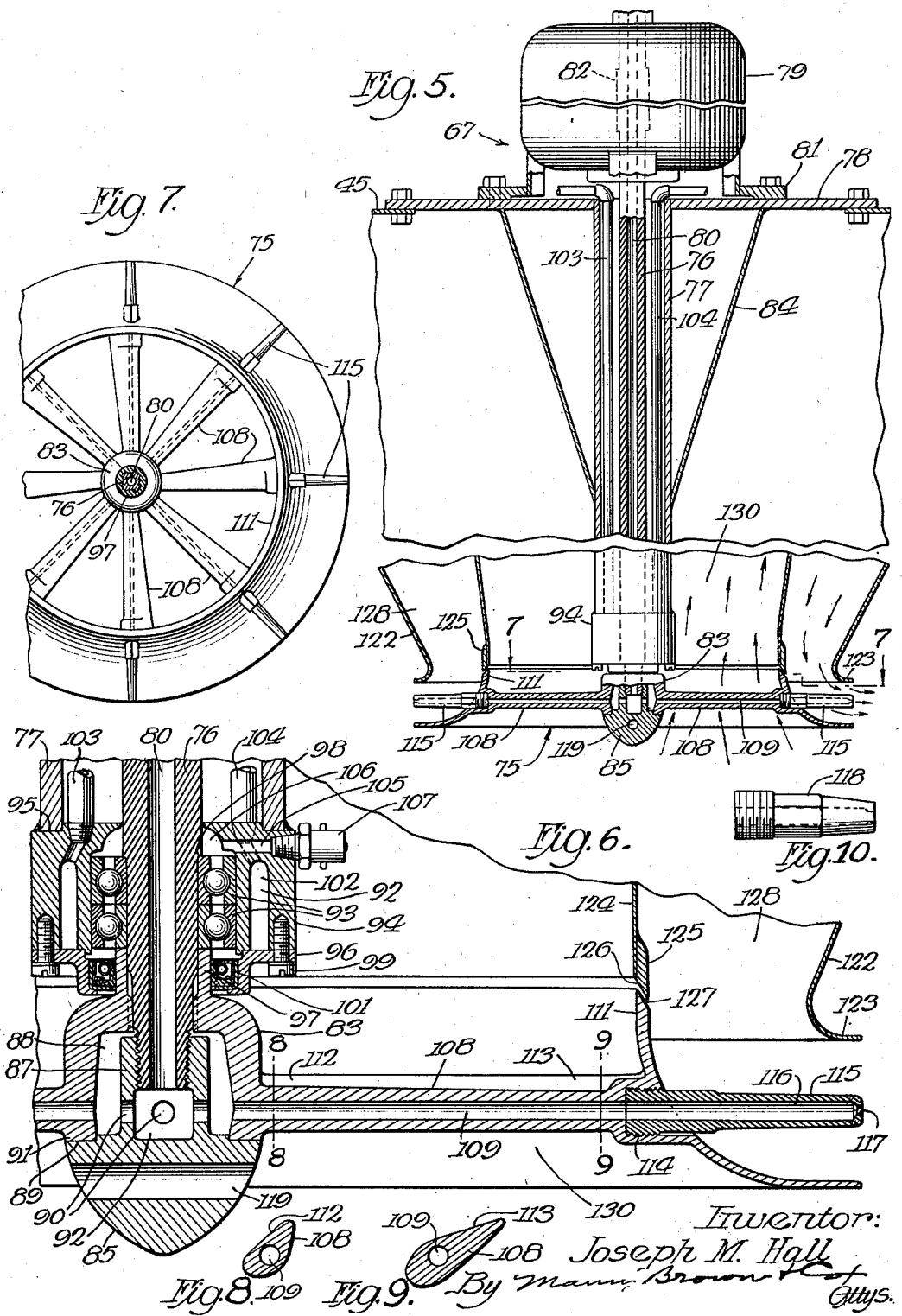

2,287,795

UNITED STATES PATENT OFFICE 2,287,795

MECHANISM FOR REMOVING MOISTURE FROM LIQUID PRODUCTS

Joseph M. Hall, Chicago, Ill., assignor to Drying & Concentrating Company, a corporation of Delaware Application December 8, 1938, Serial No. 244,642

13 Claims. (Cl. 159—4)

This invention relates to a device for removing moisture from liquid products and the principal object of the invention is the provision of new and improved mechanism of the centrifugal type for utilizing a drying gaseous medium for removing moisture from sprayed particles of a liquid product.

Another object of the invention is the provision of new and improved apparatus for dehydrating liquid products in which superheated steam is employed as a drying medium together with novel mechanism for cooling and collecting the dehydrated material.

A still further object of the invention is the provision of a new and improved apparatus for removing moisture from liquid products that is simple in construction, economical to operate, efficient in use, comparatively easy to install and that is composed of a minimum number of parts.

Other and further objects and advantages of the invention will appear from the following description, taken in connection with the accompanying drawings, in which Fig. 1 is a vertical section of the dehydrator and collector, with parts broken away;

Fig. 2 is a top plan view of the construction shown in Fig. 1, with parts omitted for the sake of clearness;

Fig. 3 is a section on the line 3—3 of Fig. 1;

Fig. 4 is a plan view of the collector shown in Fig. 1, with parts broken away;

Fig. 5 is a vertical section through the upper portion of the dehydrator showing the atomizing or spraying head in position therein, with parts broken away and parts omitted for the sake of clearness;

Fig. 6 is a vertical section of the spraying head and associated parts on an enlarged scale, with parts omitted and parts broken away;

Fig. 7 is a section on the line 7—7 of Fig. 5;

Fig. 8 is a section on the line 8—8 of Fig. 6;

Fig. 9 is a section on the line 9—9 of Fig. 6; and

Fig. 10 is a side elevation of a modified form of nozzle.

In removing moisture from liquid products, such as milk and the like, the drying chamber may be of the cyclone type in which the liquid product is sprayed into a rotating column of drying gaseous medium as it moves spirally downwardly within the chamber. The centrifugal force of the rotating column causes the heavy particles of the products to be thrown against the walls of the chamber where they gravitate to the lower portion of the chamber and are removed. In the present invention, the drying medium is caused to reverse and flow in an upwardly moving inner spiral so that any of the liquid product carried over from the outer into the inner spiral will be thrown by centrifugal force into the outer spiral and an efficient separation of the gaseous drying medium from the product will be effected. It is desirable that the liquid product be so sprayed into the chamber that none of the spray will be projected into the inner spirally moving drying medium whereby an extremely small amount, if any, of the dehydrated particles will be carried over from the dehydrating chamber with the drying medium. In the present invention, a rotating deflector is employed for deflecting drying medium outwardly across the spray nozzles whereby none of the sprayed material contacts the inner spiral of drying medium, furthermore, the rotation of the deflector materially assists in increasing the rotation of the drying medium as it enters the chamber. While in the present invention, superheated steam at high temperature, say from 400° to 450° F., and low pressure, say about that of the atmosphere or slightly above, is contemplated as the drying medium, it is understood that any other drying gaseous medium such as heated air or other gas may be employed.

This invention is an improvement on the construction disclosed in my United States Patent No. 2,217,547 granted to me October 8, 1940.

On the drawings is shown a portion of an apparatus for removing moisture from a liquid product which comprises a dehydrator or evaporator 13 into which the drying fluid product is conducted, a collector 14 for collecting the dried particles, and a cooler or cooling mechanism 20 for cooling the collected dehydrated material.

The evaporator or dehydrator chamber 13 has an upper cylindrical portion and a lower tapered portion 131. The chamber 14 has a top wall 121 provided with an axial opening around which is secured the worm 129 of an intake conduit 44 for the heated drying medium and into which the casing extension 124 of a discharge conduit 45 for the drying medium extends. Spray mechanism 67 including a spray head 75 and associated mechanism is mounted in the chamber adjacent to the lower end of the casing 124 as will presently appear.

The liquid product is delivered by a suitable pump or the like through the pipe 69 to the spray or atomizing mechanism 67. The spray mechanism comprises a spray head 75, Figs. 5 and 6, rigidly mounted on a rotating hollow spindle 76, see Fig. 5, which extends upwardly through the conduits 44 and 45, Fig. 1, and is surrounded by a housing 77 which is rigidly secured to a plate 78, Fig. 5, which in turn is mounted on the upper wall of the conduit 45. The spindle is adapted to be rotated by a suitable motor 79 mounted on a plate 81 secured to the plate 78. The spindle 76 is hollow, as shown at 80, for conducting the liquid product to the spray head and may be attached to, or constitute a prolongation of, the armature shaft 82 of the motor, see Fig. 5. The housing 77 is adapted to prevent the dehydrating fluid from overheating the liquid product during its flow through the spindle.

Surrounding the housing 77 is a casing 84 having its upper end rigidly connected to the plate 78 as being welded thereto and having its lower end tapered for engaging the housing 77 to which it is rigidly connected as by welding or the like. The casing 84 constitutes a brace for holding the housing 77 rigid relative to the plate 78. Slidably splined on the lower end of the spindle 76, see Fig. 6, is a hub 83 of the spray head 75. This hub is held in position on the spindle 76 by a bullet nosed cap member 85 having its tapered portion extending downwardly and having an axial projection 87 thereon extending upwardly into a recess 88 in the hub 83 and having internal threads for engaging screwthreads on the lower end of the spindle 76. The cap 85 is provided with an annular shoulder 89 which is adapted to engage a corresponding annular projection 91 on the hub 83 for holding the parts rigidly connected together. The cap member is provided at its central portion with a cavity 92 which is in communication with the bore 80 of the spindle 76 and constitutes a small reservoir for liquid delivered thereto through said bore. Radial passages 90 extend to the recess 88.

Suitable bearings are provided for the lower end of the spindle 76. In the form of the construction shown, two sets of ball bearings 93 are employed for this purpose. These bearings are slidably mounted on the reduced lower end of the spindle 76 whereby the spindle may be removed when necessary or desirable. The bearings are mounted in a sleeve 94 which is provided on its upper end with a rabbet 95 for receiving the lower end of the casing 77 to which it is rigidly secured as by being welded thereto. The lower end of the sleeve is provided with a cap 96 having an axial opening for receiving an upwardly extending projection 97 of the hub 83. The projection 97 is adapted to engage the inner race of the lower roller bearing for holding the roller bearings in position against a shoulder 98 on the spindle 76, as clearly shown in Fig. 6 of the drawings. The cap 96 is secured to the lower end of the sleeve 94 by means of the tapped screws 99. The cap 96 is provided with a recess in which a liquid seal 101 is mounted.

The spindle 76 is rotated at high speed and in order to prevent heating of the bearings, these bearings are water cooled. As shown, the sleeve 94 is provided with an annular recess 102 and water is adapted to be circulated around this recess. The water enters through a pipe 103 and is discharged through a pipe 104.

Means are provided also for lubricating the bearings. As shown, a passage 105 leading to a cavity 106 above the bearings is provided with a grease nipple 107 through which the lubricant may be introduced.

The hub 83 is provided with a plurality of radially extending arms or nozzle members 108 each having an axial bore 109 in communication with the recess 88 and the recess 92 in the hub 83 through the passages 90. The outer ends of the arms 108 are rigidly connected to an annular deflector member 111 which is concave on its outer surface, as clearly shown in Fig. 6. The arms 108 are so constructed that they constitute vanes of a fan for exhausting the drying medium from the dehydrator, as will presently appear. The arms are so constructed that the flow of the exhaust will be uniform from the inner to the outer ends of these arms. In order that this may be accomplished, the flat portion 112 of the inner end of the arm, Fig. 8, is turned at a greater angle to the horizontal than the flat portion 113 of the outer end of said arms, Fig. 9.

The outer ends of the arms 108 are each provided with threaded sockets 114 for receiving the inner threaded ends of the spray nozzles 115 which extend outwardly beyond the deflector member 111. Each of these nozzles is provided with a bore 116 which is adapted to aline with the bore 109 of the corresponding arm when it is attached to its supporting arm and the outer end of the bore 116 is greatly reduced to form a nozzle or atomizer opening as at 117. The high velocity of the rotation of these nozzles tends to atomize the liquid or discharges the same in the form of a spray in the dehydrator.

Liquid products vary so much in their fluidity and other characteristics that in order to properly atomize the same, it is desirable to have nozzles of different lengths and atomizer openings of different diameters. For instance, where the liquid product is thicker or more or less viscid, a nozzle of shorter length and larger atomizer opening is provided; such, for instance, as the construction shown at 118 in Fig. 10. When thicker products, or products of less fluidity, are to be atomized, the nozzle 115 is unscrewed and nozzle 118 attached in its place.

The cap 85 is provided with a transverse opening 119 for receiving a tool for attaching or removing the cap. By means of this arrangement, the head may be readily removed by first removing the cap 85 and then sliding the head downwardly from the spindle 76. After the head has been removed, the spindle 76 may be readily removed by disconnecting the pipe 69 from the motor, releasing the motor base from the plate 78 and moving the same upwardly. This is considered an important feature of the invention because the head and other parts of the mechanism must be cleaned at frequent intervals, usually at least once every twenty-four hours when used for dehydrating food products.

Suitable means are provided for directing the drying medium such as superheated steam or other gaseous medium entering through the passage 44 downwardly across the liquid spray discharged by the nozzles. In the construction shown, the top wall 121 of the dehydrator chamber 13 has an axial opening in which is rigidly secured a guide member 122, Fig. 1. This guide member is in the form of a frustum of a cone having its side wall converging downwardly with its lower end curved outwardly, as shown at 123, see Figs. 1, 5 and 6. Opposite the guide member 122 is the deflector 111. A downwardly tapered casing 124, see Fig. 1, extending through the upper wall of the passage 44 is rigidly attached to the bottom wall of the passage 45 as shown in said figure. It is also rigidly secured to the upper wall of the passage 44 and forms a steamtight joint therewith. The lower end of the casing 124 has rigidly attached thereto an annular reinforcing or strengthening ring 125 which has its lower end provided with an inclined surface 126 which diverges downwardly. The deflector 111 is provided on its upper edge with a corresponding inclined surface 127 which converges upwardly. These inclined surfaces overlap each other and are in close proximity as clearly shown in Fig. 6 and by means of this arrangement, the dehydrating medium which flows downwardly through the intake passage 128 formed by the conductor 122 and deflector 111, will not tend to bypass into the exhaust passage 130 formed by the casing 124. The steam or other drying gaseous medium, in passing down the passage 128 between the directing member 122 and the casing 124, will be directed outwardly and downwardly across the outer end of the nozzle 115 by the deflector 111 thereby atomizing the liquid product as it escapes through the atomizer opening 117.

The dehydrator is so constructed that it functions somewhat like a cyclone collector and in order that a greater portion of the drying medium shall be separated from the dehydrated material after it is desiccated, suitable means are provided for causing the medium, when it is introduced into the dehydrator, to rotate about the axis of the dehydrator so as to centrifugally separate the product from the dehydrating fluid employed. As shown, the evaporating medium passing through the conduit 44 is conducted through a snail 129, that is, is caused to take a circular or spiral path about the axis of the collector and it continues to move in a spiral path as it passes through the intake passage 128 across the nozzles 115 into the dehydrator where it encounters the finely divided liquid particles that are being discharged by the spray head as it rotates at high speed, thereby dehydrating or reducing the moisture content of those particles. The high speed at which the nozzles rotate through the entering stream of drying medium and the friction between the incoming drying medium and the annulus or deflector 111 will cause an increase in the rotational velocity of the entering steam or drying medium. This spiral motion of the drying medium will cause the particles of the liquid product to be thrown outwardly by centrifugal force toward the walls of the dehydrator and will be directed by the conical wall 131 downwardly by gravity into a circular passage 132 at the bottom of the dehydrator, Fig. 1.

The discharge of a suitable fan or blower is connected to the passage 44 and this, together with the fan blades 108 of the spray head, will exhaust a greater portion of this drying medium axially upwardly through the casing 124 from the dehydrator. As a result of this construction, the drying medium enters the chamber from the conduit 44 through a worm 129, moves downwardly in an outer spiral to the lower portion of the chamber, reverses and flows upwardly in an inner spiral in contact with the outer spiral and is discharged through the passage 130 into the discharge conduit 45.

The dehydrator 13 is provided with a channel 132 around its lower end for receiving the dehydrated material sliding down the inclined walls 131 thereof. The conical walls 131 extend slightly over this passage as shown at 133. An inverted conical deflector member 134 has its lower edge extending slightly over the passage 132 as at 135 and its apex extends axially upwardly within the lower portion of the dehydrator for directing the particles falling thereon into the circular channel or passage 132. The overhanging portions 133 and 135 of the walls 131 and 134 tend to prevent the particles falling into the passage 132 from escaping back into the dehydrator, as will presently appear.

Where dehydration is completed within the chamber 141, the particles falling into the passage 132 are at such temperature that they must be cooled before storage in order to avoid agglomeration. The cooling mechanism 20 is located at any convenient position, either directly below the dehydrator or spaced laterally therefrom. If directly below, the dehydrated particles may fall by gravity into the cooling mechanism, but if located laterally thereof, as shown in the drawing, suitable means must be provided for conveying those particles to the cooling mechanism. Any suitable conveyor may be used for this purpose.

In the construction shown, which is by way of example only, a fluid conveyor is employed for this purpose. The use of a fluid conveyor necessitates the use of a collector for separating the dehydrated material from this conveyor fluid. The centrifugal collector 14, which is of conventional design, is employed for this purpose. The fan of the collector 14 has its intake in communication with the passage 132 through a conduit 137 for conveying the dry particles mixed with a limited amount of steam or other drying medium from the dehydrator over to the collector. In order that this steam or other medium shall remain dry or superheated, a suitable shunt is provided in the form of a passage or conduit 136 for shunting a portion of the heated drying medium from the conduit 44 into the passage 132 for raising the temperature of the steam or other drying gaseous medium therein and also for boosting the velocity of the steam or other drying medium around the channel 132 and through the pipe 137. The amount of steam or other drying medium directed through the passage 136 is adapted to be controlled by a valve 140. Just sufficient heated drying gaseous medium or superheated steam is employed to insure the dehydrated particles remaining dry while being conveyed to the cool mechanism. The conduit 136 directs steam or other heated drying medium to the passage 132 at a point adjacent to, but not in communication with, a discharge passage 137 which conducts the medium to the collector 14. The passages 136 and 137 being adjacent to each other, the drying medium is caused to move around the passage, as will appear from an inspection of Fig. 3. This movement of the medium will insure against the dried particles collecting in the passage 132 and obstructing free flow of those particles. The mixture of the drying medium and dried particles will be separated in the collector 14. The dry particles are discharged through the passage 138 and the gaseous medium discharged through the passage 56 which is tangential to the collector 14.

In order to cool the material conveyed from the dehydrator or evaporator, it is discharged from the conveyor and separator 14 into the cooler 20. The cooler 20 comprises a support 155 on the top of which is mounted the separator 14 and which also supports a cyclone collector 150. The dried material separated from the drying gaseous medium is discharged through the passage 138 into the collector 150 across the discharge passage 139 of a fan 141 which discharges air tangentially into said collector. This air cools the product and finally escapes upwardly through an axial passage 156. The collector 150 operates as a cyclone collector for separating the cooled solid particles from the air discharged from the fan 141. This fan may be operated by an independent motor 142 and the air may be taken from the atmosphere or from a suitable source of conditioned air. The centrifugal separator 14 is adapted to be operated by a suitable motor 143, see Fig. 4. Since the separator 14 employed may be of any commercial type and since the details of this separator constitute no part of the present invention, it is not thought necessary to specifically describe the same any further than to say it is of the horizontal centrifugal type.

The cooled particles gravitate to the lower conical portion of the collector 150 from which they may be removed through a rotary valve 151 operated by a motor 152.

While the dehydrator 13 and associated mechanism is disclosed as completely drying the sprayed particles, it is understood that by increasing the feed of the liquid product or by spraying a fresh product into the chamber in sufficient volume, the mechanism will function as a concentrator for concentrating the liquid product.

It is thought from the foregoing taken in connection with the accompanying drawings that the construction and operation of my device will be apparent to those skilled in the art, and that changes in size, shape, proportion and details of construction may be made without departing from the spirit and scope of the appended claims.

I claim:

1. In a dehydrating system, a dehydrator having its top wall provided with a conical depression having its lower edge curved outwardly, forming an axial opening, an open ended discharge casing extending into said opening and forming with the wall of said depression an annular passage, an intake tubular member in communication with said passage, a discharge passage in communication with the interior of said casing, a hollow spindle extending through said casing, means for rotating said spindle, a spray head on the lower end of said spindle, said head comprising a plurality of arms having longitudinal passages for the discharge of a liquid product therethrough, an annular deflector member on the outer ends of said arms, said deflector member having an outwardly and downwardly sloping surface, the meeting edges of said deflector and casing being provided with overlapping beveled edges for preventing a reverse flow of a dehydrating fluid therebetween, detachable nozzles for said arms, means for rotating said head, means for discharging a liquid product through said nozzles, means for conducting a dehydrating medium through said passage, said arms constituting fan blades for discharging said medium into said discharge passage.

2. In a dehydrating system, an atomizing head comprising a hub portion having a liquid reservoir therein, a plurality of arms extending outwardly from said hub, and having passages in communication with said reservoir, a deflector member in the form of an annulus secured to the outer ends of said arms and having an outwardly and downwardly sloping surface, and interchangeable nozzles for said arms extending through to the concave face of said annulus.

3. In a dehydrating apparatus, a spray head comprising a hollow hub portion, a hollow shaft extending axially of said hub portion for rotating said head, bearings for said shaft, spray arms extending outwardly from said hub in a substantially horizontal plane, said arms having an annular deflector member provided with an outwardly and downwardly sloping surface and connected to said arms to rotate therewith and nozzles secured to said arms and extending outwardly of said deflector member for atomizing a liquid product.

4. In a dehydrating apparatus, a spray head comprising a hollow hub portion, a hollow shaft extending axially of said hub portion for rotating said head, bearings for said shaft, spray arms extending outwardly from said hub in a substantially horizontal plane, said arms having an annular deflector member provided with an outwardly and downwardly sloping surface and connected to said arms to rotate therewith and nozzles secured to said arms and extending outwardly of said deflector member for atomizing a liquid product, said arms having flat faces turned at an angle to the plane of said arms to form fan blades to cause an upward current of air through the annular space formed by said annular member.

5. In an apparatus for dehydrating liquid products, a dehydrating chamber, means for discharging a drying medium into said chamber, a rotatable distributor head having radially extending flattened arms functioning as fan blades, nozzles on said arms for spraying a liquid product into said drying medium, a casing on the top of said chamber having a downwardly extending exhaust conduit, a motor having an armature shaft extension extending downwardly through an opening in said casing axially through said discharge conduit, a plate on said casing and removably connected thereto for supporting said motor, and a cap detachably connected to the lower end of said armature shaft extension for detachably connecting said head to said extension whereby said head may be removed by first removing said cap and said motor may then be removed by releasing said plate.

6. In a system for dehydrating a liquid product, an interiorly unobstructed dehydrator, a rotatable atomizer head for said dehydrator, said head being provided with a plurality of arms extending outwardly therefrom, each having an axial bore, the outer ends of said bores being internally threaded whereby nozzles of different bores may be interchangeably connected to said arms for discharging a liquid product in finely divided form into said dehydrator, means for conducting said liquid product to said head axially thereof, an annulus extending around said head and secured to the outer ends of said arms and having an outwardly and downwardly sloping surface, said nozzles, when secured in said bores, extending outwardly of said annulus, a conduit for conducting air upwardly across said arms, a conduit for conducting air downwardly across said concave face and nozzles, and means, including said arms, for exhausting said drying fluid axially upwardly from said dehydrator through said first-named conduit.

7. In a dehydrating system, an atomizing head comprising a hub portion having a recess therein opening downwardly, said head having outwardly extending arms having axial bores and being in the form of fan blades for assisting in exhausting a drying medium from said system, said head having an upwardly extending projection, a spindle slidably interlocked with said projection, and a cap nut connected to the lower end of said spindle for holding said head thereon and forming a closure for said recess, said cap nut being removable from said spindle, whereby said head may be readily removed from said spindle when it is desired to clean the same.

8. In a system for dehydrating a liquid product, a dehydrator chamber, an intake conduit for conducting a drying medium to said chamber in a downwardly moving spiral, a discharge conduit extending axially through said intake, a spray head below said discharge conduit having spray arms and nozzles for spraying a liquid product into the intake spirally moving drying medium, means for rotating said head, said spray arms comprising fan blades for exhausting said drying medium from said chamber and for assisting in causing spiral movement of said medium, means for delivering said product to said spray head, and an annular deflector carried by said arms for directing said medium downwardly and outwardly into said chamber, said nozzles extending outwardly into the deflected drying medium whereby the rotation of said nozzles will increase the rotation of said drying medium during its entry into said dehydrator chamber.

9. In a system for dehydrating a liquid product, a dehydrator chamber, an intake conduit for conducting a drying medium to said chamber in a downwardly moving spiral, a discharge conduit extending axially upwardly through said intake to the exterior of said chamber, a spray head below said discharge conduit having spray arms extending outwardly therefrom uniformly around said head, means for rotating said head, an annular deflector secured to the outer ends of said arms and having its upper face concave, nozzles detachably connected to the outer ends of said arms and extending outwardly beyond said deflector for spraying a liquid product into the intake spirally moving drying medium, said spray arms comprising fan blades for exhausting said drying medium from said chamber into said discharge conduit and for assisting in causing spiral movement of said medium, and a conduit extending axially of said head for delivering said liquid product thereto.

10. In a system for dehydrating a liquid product, a dehydrator having a cylindrical unobstructed upper portion, a tapered lower portion terminating in a circular channel at its lower end, an atomizer head, means for rotating said head, a nozzle carried by said head for atomizing a liquid product, said head being rotatably mounted on said dehydrator, means for introducing a heated drying medium and causing the same to flow downwardly in a spiral across said nozzle for dehydrating the atomized liquid product, a deflector carried by said head and rotatable therewith for deflecting said drying medium downwardly and outwardly from said nozzle into said chamber and for increasing the velocity of said medium contacting said deflector, means for causing said medium to flow upwardly in a spiral within the first-named spiral and out of said dehydrator through said head, whereby dehydrated particles of said product will be thrown by centrifugal action against the side walls of said dehydrator from said spirals and collected in said channel by gravity.

11. In a system for dehydrating a liquid product, a dehydrator having an unobstructed interior, an atomizer head, means for rotating said head, means, including an intake passage, for introducing a drying medium into said dehydrator and for discharging the same downwardly along the axis of said dehydrator into the latter, a conduit for conducting said medium axially upwardly from said dehydrator, said head having a plurality of radially extending members terminating in nozzles, said members having their intermediate portions flattened to form fan blades for exhausting said heating medium from said dehydrator and discharging the same into said conduit, and an annular deflector having a concave upper face, through which the outer ends of said members extend, for deflecting the drying medium outwardly and downwardly.

12. In a system for removing moisture from liquid products, a chamber substantially circular in cross section and having a tapered lowered portion, means, including a conduit, for introducing a drying medium axially into the upper portion of said chamber and for causing the same to descend in said chamber in an outer spiral and then to ascend in an inner spiral within said chamber to a point of discharge from said chamber, a spray head beneath said conduit, means for rotating said head, nozzles movable with said head arranged for spraying a liquid product into said outer spiral only, an annular rotatable deflector movable with said head so constructed and arranged as to deflect the drying medium entering said chamber downwardly and outwardly across said nozzles.

13. In a system for removing moisture from liquid products, a drying chamber substantially circular in cross section, a conduit for conducting a gaseous drying medium to the intake of said chamber, means for causing said medium to move downwardly within said chamber in an outer spiral and then ascend in an inner spiral rotating in the same direction as said outer spiral and within said outer spiral to a point of discharge from said chamber, spray means for spraying a liquid product into the outer spiral only of said medium, a deflector member within the upper end portion of said chamber and extending around said inner spiral and having an outwardly and downwardly sloping surface for deflecting the drying medium entering said chamber downwardly and outwardly, and means for rotating said deflector member in the same direction as said outer spiral around said inner spiral for assisting in the rotation of said drying medium in entering said chamber.

JOSEPH M. HALL.